United States Patent
Butti et al.

(10) Patent No.: US 10,923,900 B2
(45) Date of Patent: Feb. 16, 2021

(54) LOW VOLTAGE PROTECTION DEVICE WITH CLOCK TESTING

(71) Applicant: ABB Schweiz AG, Baden (CH)

(72) Inventors: Agostino Butti, Vittuone (IT); Antonio Currá, Abbiategrasso (IT); Luca Ghezzi, Gallarate (IT); Vittorio Cozzi, Vittuone (IT)

(73) Assignee: ABB Schweiz AG, Baden (CH)

( * ) Notice: Subject to any disclaimer, the term of this patent is extended or adjusted under 35 U.S.C. 154(b) by 318 days.

(21) Appl. No.: 16/008,499

(22) Filed: Jun. 14, 2018

(65) Prior Publication Data
US 2018/0366935 A1 Dec. 20, 2018

(30) Foreign Application Priority Data
Jun. 14, 2017 (EP) ..................................... 17176116

(51) Int. Cl.
| | | |
|---|---|---|
| H01H 3/04 | (2006.01) | |
| H02H 3/04 | (2006.01) | |
| H02H 3/33 | (2006.01) | |
| G05B 19/042 | (2006.01) | |

(52) U.S. Cl.
CPC ............ H02H 3/044 (2013.01); H02H 3/335 (2013.01); G05B 19/0428 (2013.01)

(58) Field of Classification Search
CPC . H02H 3/04; H02H 3/16; H02H 3/335; H04B 17/00; G01R 31/31937; G05B 19/0428; G05B 19/0425; G05B 19/058
See application file for complete search history.

(56) References Cited

U.S. PATENT DOCUMENTS

| | | | | |
|---|---|---|---|---|
| 5,642,052 A | * | 6/1997 | Earle ..................... | G01R 31/50 324/556 |
| 7,617,409 B2 | * | 11/2009 | Gilday ................... | H03K 23/52 326/93 |
| 8,599,523 B1 | * | 12/2013 | Ostrovsky .............. | G01R 31/50 361/45 |

FOREIGN PATENT DOCUMENTS

WO 03073577 A1 9/2003

OTHER PUBLICATIONS

R. Tekumalla and P. Krishnamoorthy, "On-chip Clock Testing and Frequency Measurement," 2014 IEEE 23rd North Atlantic Test Workshop, Johnson City, NY, 2014, pp. 11-14. (Year: 2014).*
European Patent Office, Extended Search Report issued in corresponding Application No. 17176116.6, dated Jan. 4, 2018, 5 pp.

* cited by examiner

Primary Examiner — Thienvu V Tran
Assistant Examiner — Peter M Novak
(74) Attorney, Agent, or Firm — Taft Stettinius & Hollister LLP; J. Bruce Schelkopf

(57) ABSTRACT

An electronic protection device for a LV electric line, the protection device being provided with a control unit comprising a controller including digital data processing resources clocked by a first clock source adapted to provide a first flock signal with a first nominal clock frequency. The control unit comprises a clock testing arrangement adapted to check whether the first clock source is properly operating.

20 Claims, 7 Drawing Sheets

LOW VOLTAGE PROTECTION DEVICE WITH CLOCK TESTING

Figure 1:
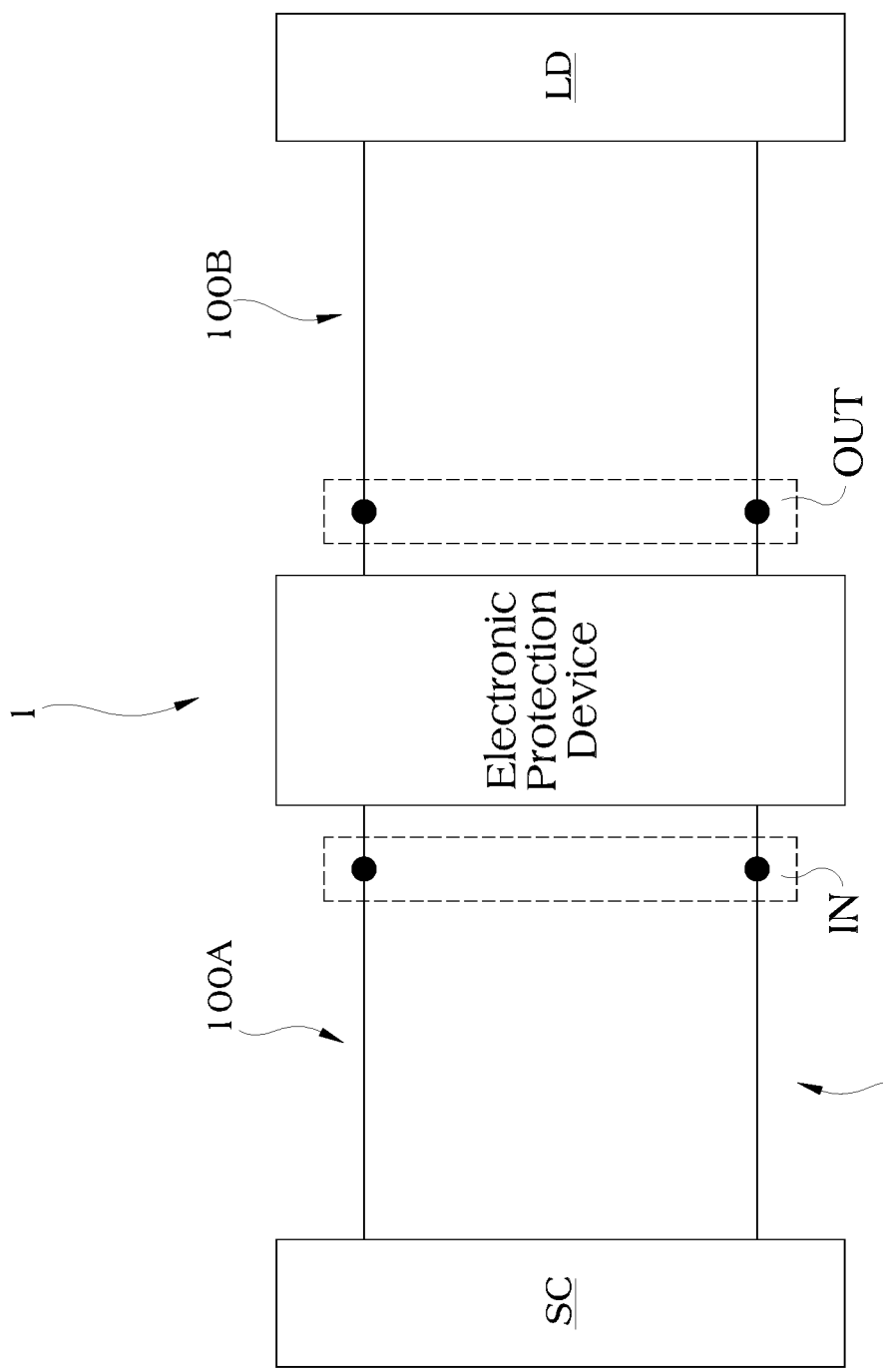

The present invention relates to an electronic protection device for low voltage (LV) electric lines. As is known, an electronic protection device for LV electric lines generally consists in an electronic device adapted to be operatively associated to an electric line to provide protection and monitoring functionalities for some portions of said electric line.

An electronic protection device for LV electric lines normally comprises a control unit including electronic arrangements to check the operating conditions of the electric line and determine whether fault conditions (e.g. ground fault conditions, over-voltage conditions, over-current conditions, arc fault conditions and the like) are present.

Typically, the above-mentioned control unit includes a controller (e.g. a microcontroller) including data processing resources of digital type, e.g. a CPU capable of executing stored software instructions, peripheral modules and I/O ports to carry out its functionalities, according to the needs.

An electronic protection device for LV electric lines further includes or is operatively associated with a relay capable of interrupting said electric line upon receiving a trip signal generated by said control unit.

As is known, the control unit of an electronic protection device for LV lines is normally configured to carry out test procedures to check the operating status of the internal components of the electronic protection device.

Among others, said test procedures typically include so-called "wrong frequency" test procedures aimed at checking whether the internal clock source, which typically provides a clock signal to the data processing resources of the controller, is properly operating.

Timing faults of said internal clock source might in fact jeopardize operation of the controller and, consequently, the functionalities of the electronic protection device.

Known clock testing arrangements adopted in currently available electronic protection devices to carry out said "wrong frequency" test procedures show some drawbacks.

Some currently available solutions employ timers included in the controller to operate. This solution often entails a computational overload for the controller or the adoption of expensive controllers having a relatively high computational power or hardware components (e.g. peripherals) dedicated to testing functionalities.

Other currently available solutions are quite complex to arrange and often entail unacceptable industrial costs for their arrangement.

In the state of the art, it is thus still quite felt the need for innovative electronic protection devices employing clock testing arrangements, which are relatively easy and inexpensive to arrange and produce at industrial level.

In order to respond to this need, the present invention provides an electronic protection device according to the following claim 1 and the related dependent claims.

In a general definition, the electronic protection device comprises a control unit including a controller with digital data processing resources clocked by a first clock source adapted to provide a first flock signal with a first nominal clock frequency.

Said control unit comprises a clock testing arrangement adapted to check whether said first clock source is properly operating.

Said clock testing arrangement comprises:
a second clock source adapted to provide a second clock signal with a second nominal clock frequency, said second clock source being adapted to operate independently from said first clock source;
a task-performing module clocked by said second clock source, said task-performing module being adapted to perform a predefined testing task within an expected time interval;
a data processing module clocked by said first clock source and adapted to control the operation of said task-performing module.

Said data processing module is adapted to determine whether said first clock source is properly operating by obtaining a measured time value indicative of the time employed by said task-performing module to perform said predefined testing task and by comparing said measured time value with said expected time interval.

Preferably, the second nominal clock frequency of said second clock source is lower than the first nominal clock frequency of said first clock source.

Preferably, said data processing module is adapted to obtain said measured time value by periodically checking whether said task-performing module has completely carried out said predefined testing task at one or more subsequent checking instants and by periodically updating said measured time value at each checking instant.

Preferably, said data processing module is adapted to execute a test procedure comprising:
executing a starting step, in which said data processing module makes said task-performing module start executing said predefined testing task and sets said measured time value at an initialization value, at a start instant;
executing a checking step, in which said data processing module checks whether said task-performing module has completely carried out said predefined testing task at one or more subsequent checking instants until said task-performing module has completely carried out said predefined testing task or until said measured time has exceeded a maximum value, said data processing module updating said measured time value at each checking instant;
when said task-performing module has completely carried out said predefined testing task or when said measured time has exceeded a maximum value, executing a determination step, in which said data processing module compares said measured time value with said expected time interval and determines whether said measured time value is compatible with said expected time interval.

Preferably, said data processing module is adapted to check a status signal indicative of whether said task-performing module is in an idle state or is in a busy state, when executing said checking step.

Preferably, said data processing module is adapted to execute said test procedure for one or more repetition cycles.

Preferably, said data processing module is adapted to put said control unit in an internal error state, if said measured time value is determined as incompatible with said expected time interval for one or more repetition cycles.

Preferably, said expected time interval is a predefined time value or a calibration time value stored in a memory or a time value calculated as a function of at least a temperature value indicative of a temperature measured in or in proximity of said control unit.

Preferably, said first clock source is a clock component internal to said controller or a clock circuit external to said controller.

Preferably, said second clock source is a clock circuit external to said controller or a clock component internal to said controller.

Preferably, said task-performing module is a data communication peripheral component of said controller.

Preferably, said data processing module is a data processing component of said controller or a data processing arrangement external to said controller.

Figure 2:
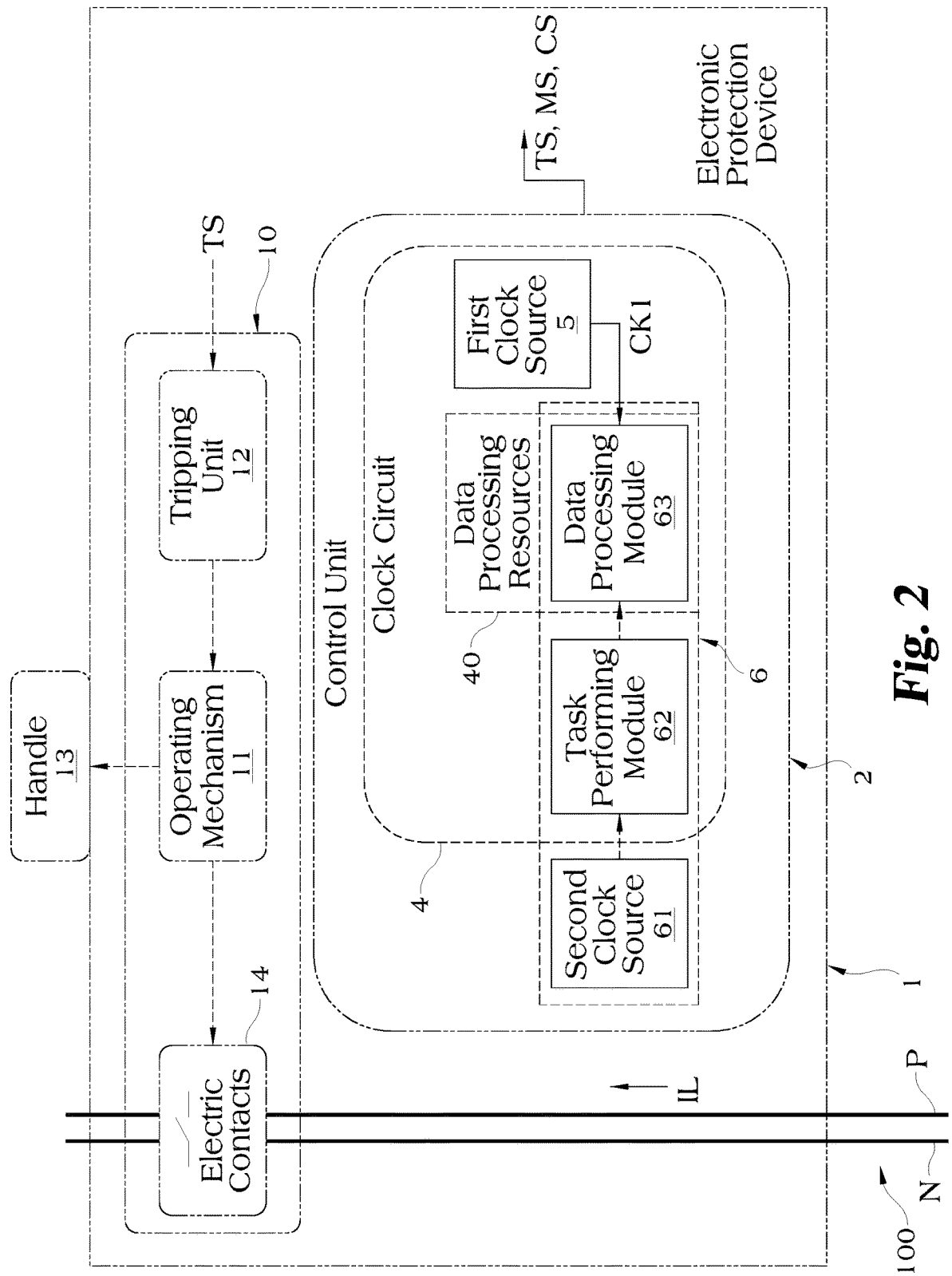
Figure 3:
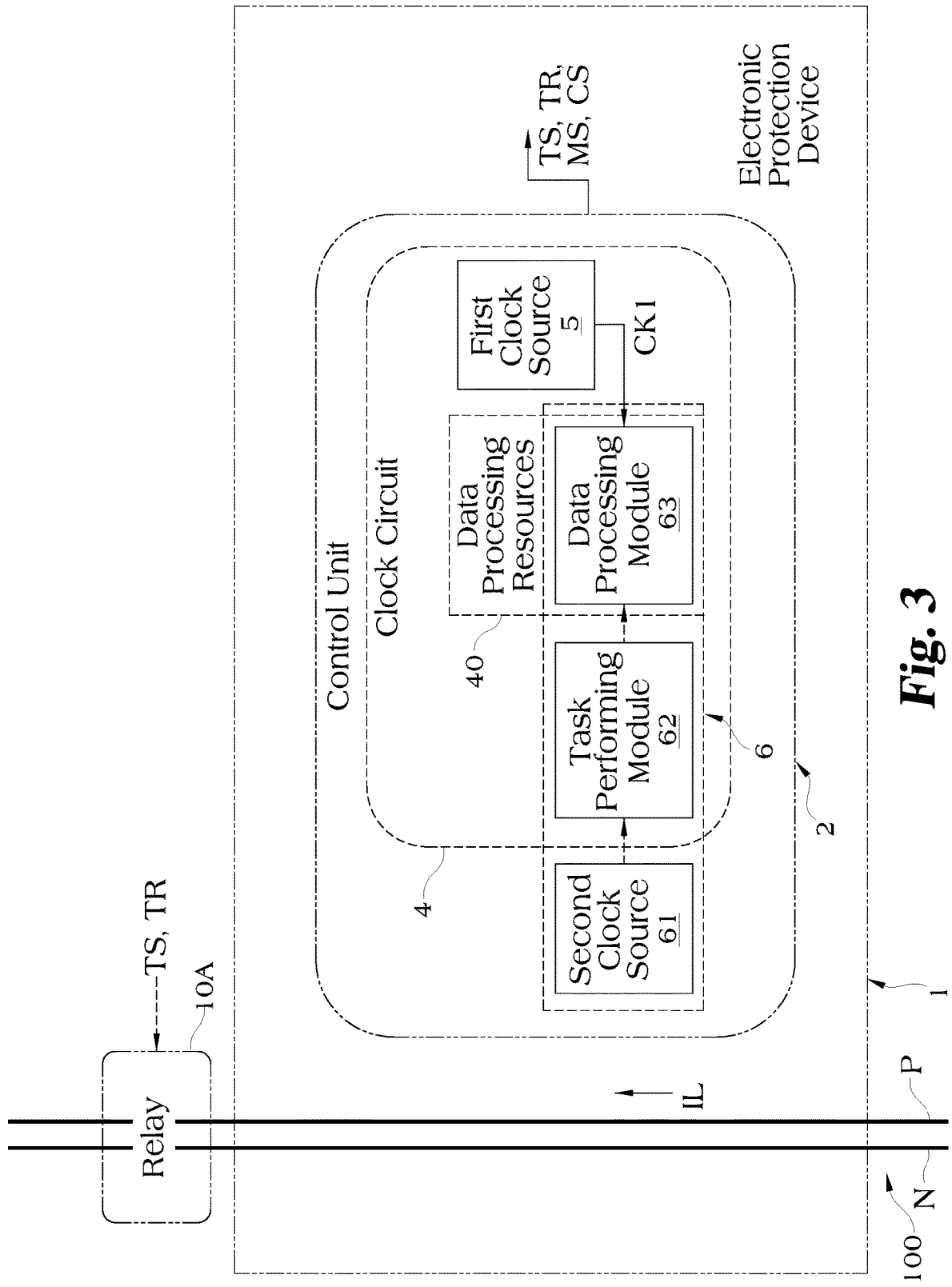
Figure 4:
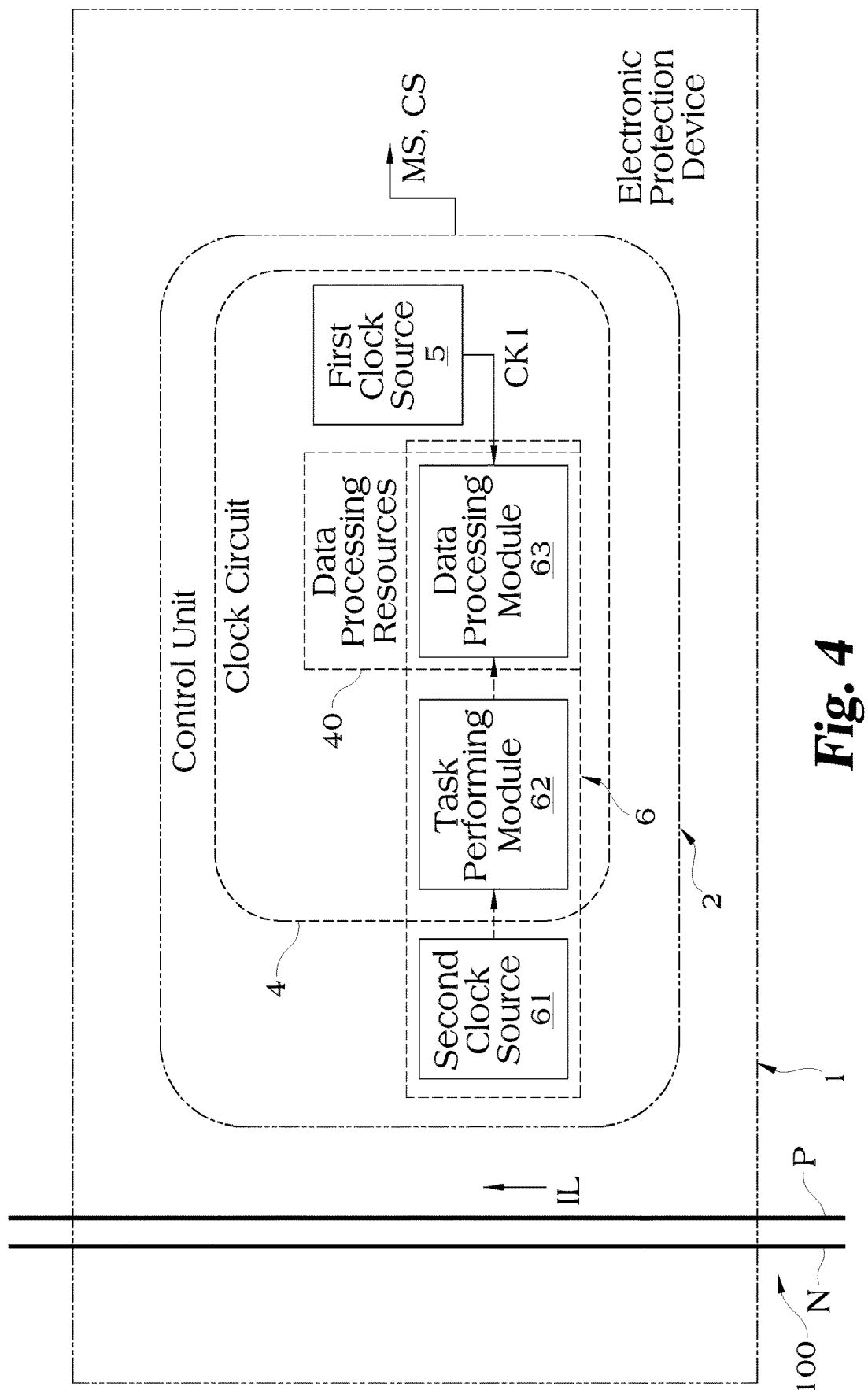
Figure 5:
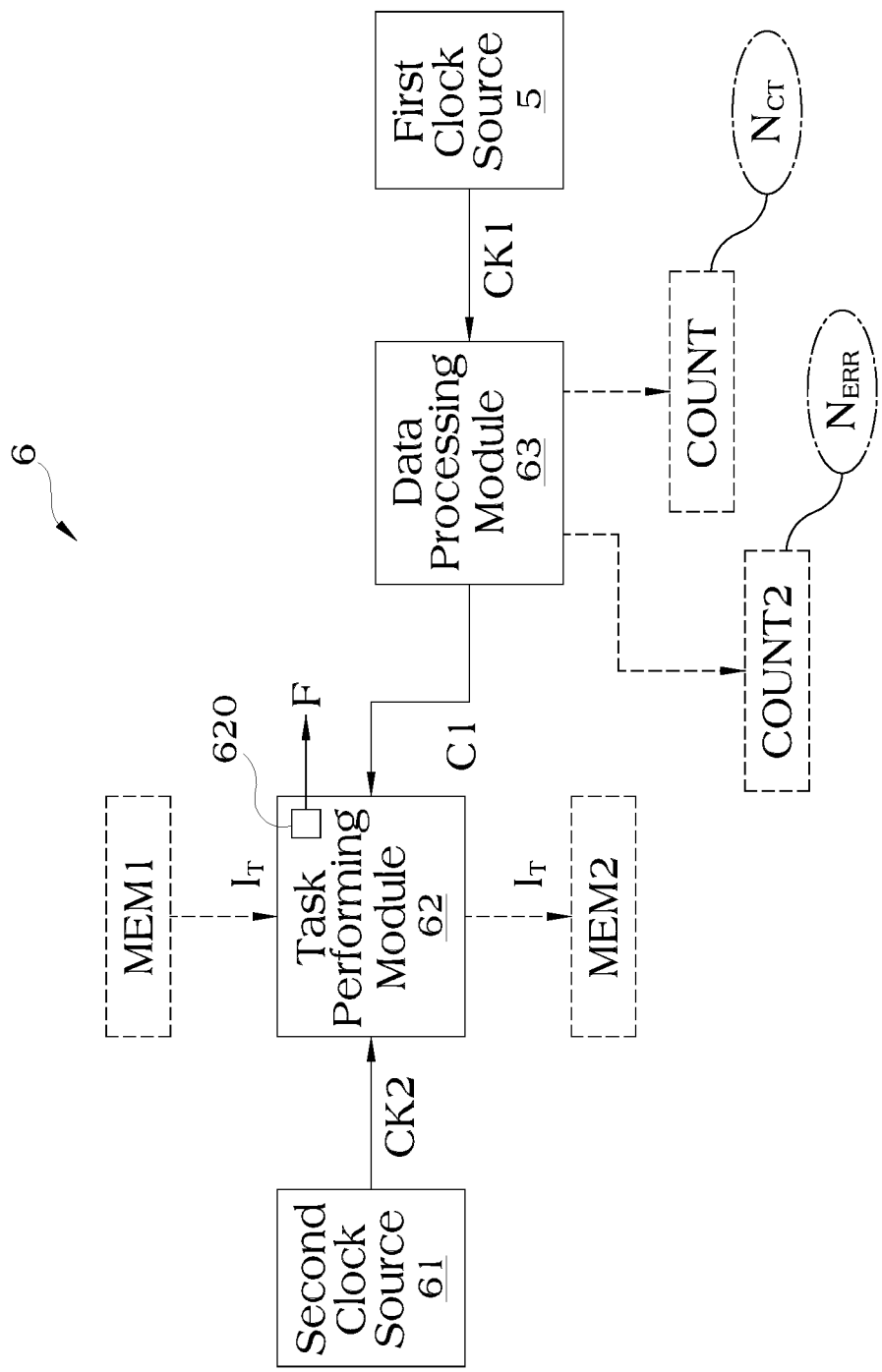
Figure 6:
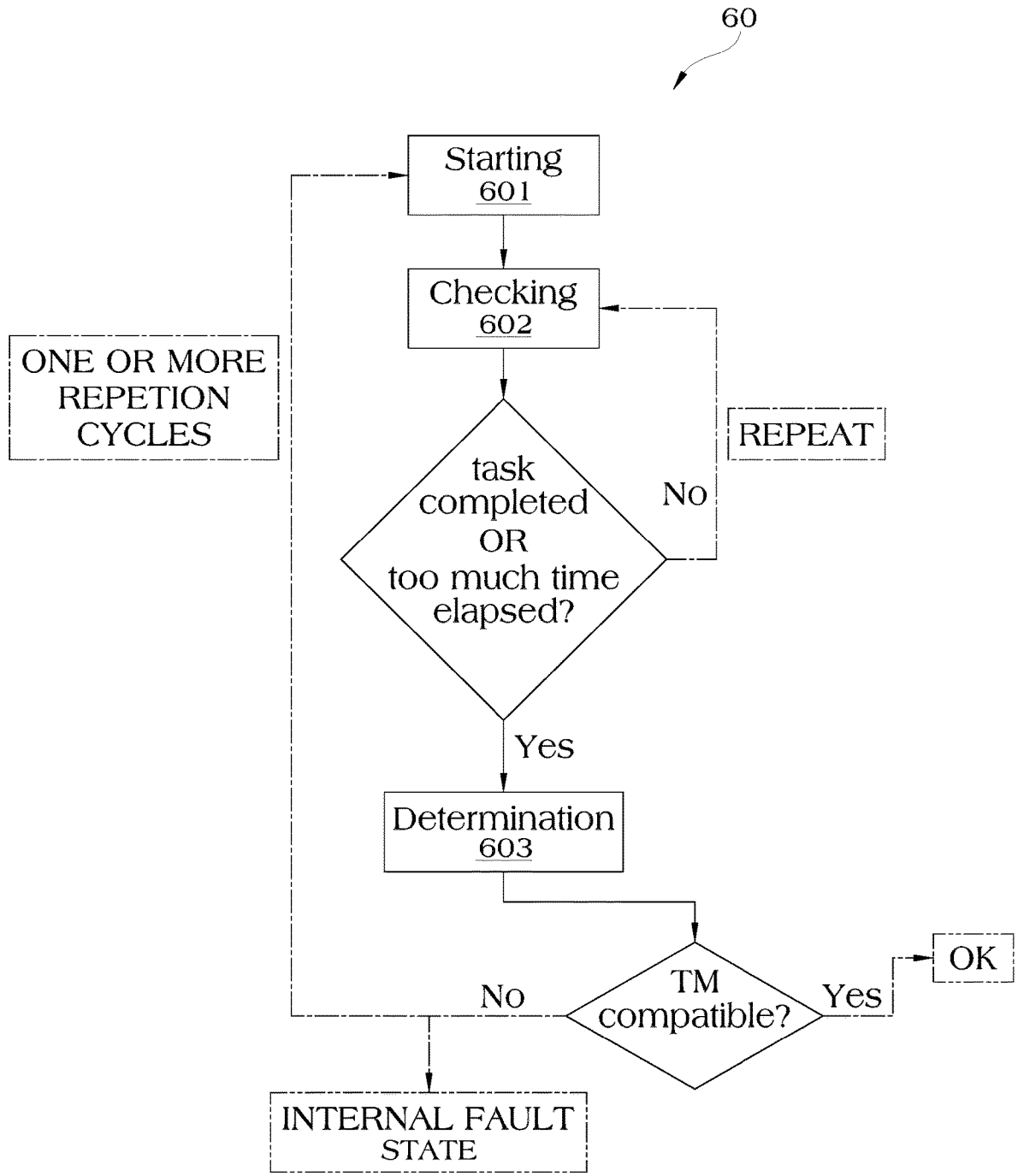
Figure 7:
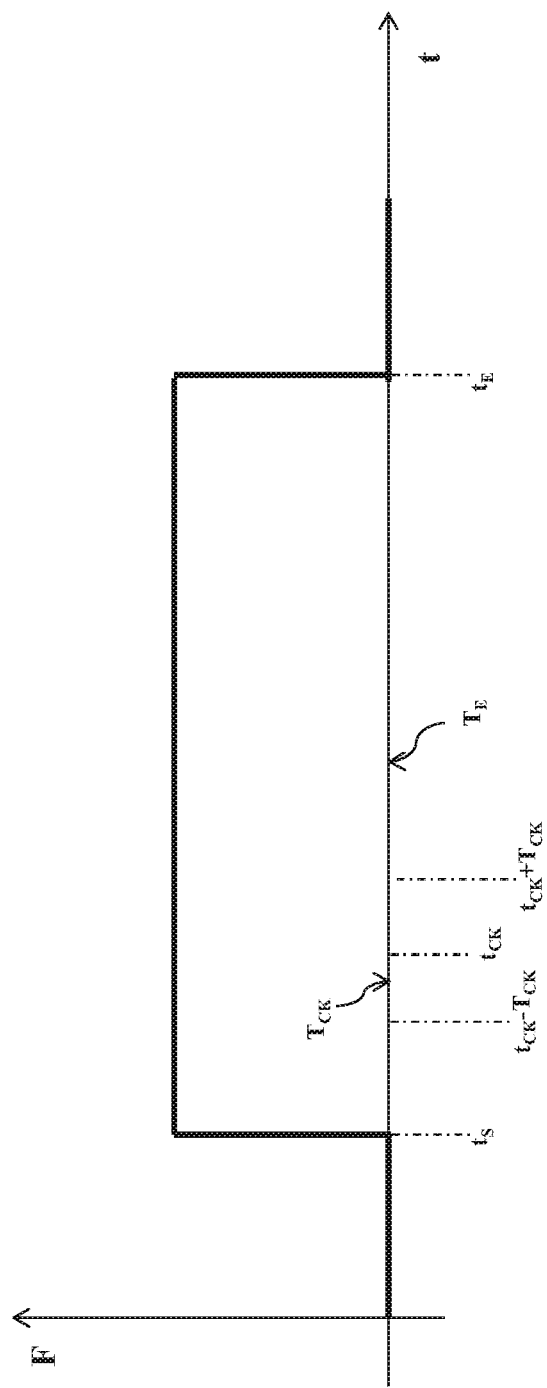

Further characteristics and advantages of the invention will become apparent from the detailed description of exemplary embodiments of the electronic protection device, which is illustrated only by way of non-limitative examples in the accompanying drawings, wherein:

FIG. 1 is a block diagram of a LV electric line to which an electronic protection device, according to the invention, is operatively associated;

FIGS. 2-4 schematically show some embodiments of the electronic protection device, according to the invention;

FIG. 5 schematically shows a clock testing arrangement included in the control unit of the electronic protection devices of FIGS. 2-4;

FIG. 6-7 schematically show the operation of the clock testing arrangement of FIG. 5.

With reference to the cited figures, the present invention relates to an electronic protection device 1, which, in operation, is associated to a low-voltage electric line 100.

For the purposes of the present application, the term "low voltage" (LV) relates to operating voltages lower than 1 kV AC and 1.5 kV DC.

The electric line 100 comprises one or more phase conductors P and, preferably, a neutral conductor N.

Preferably, the electric line 100 comprises a single-phase conductor P and a neutral conductor N. However, as the skilled person will certainly understand, the electric line 100 may have different arrangements for its own conductors, according to the needs.

The electric line 100 is intended to electrically connect an electric power source SC and an electric load LD, which may be of any type.

In operation, the electronic protection device 1 is arranged between the electric power source SC and the electric load LD, more precisely between upstream portions 100A and downstream portions 100B of the electric line 100, which are electrically connected with the electric power source SC and the electric load LD, respectively.

Conveniently, the electronic protection device 1 comprises an outer casing (not shown), preferably made of electrically insulating material, which defines an internal volume to accommodate the components of said electronic protection device.

The electronic protection device 1 comprises a control unit 2, which conveniently comprises a controller 4, e.g. a microcontroller.

The controller 4 conveniently includes data processing resources 40 of digital type, e.g. a CPU capable of executing stored software instructions, peripheral modules and I/O ports to carry out its functionalities, according to the needs.

Said data processing resources are clocked by a first clock source 5 adapted to provide a first flock signal CK1 with a first nominal clock frequency $f_1$. In this way, the timing for the data processing activities carried out by the data processing resources 40 is provided by the clock signal CK1 received from the first clock source 5.

Preferably, the first clock source 5 is a clock component (which may be of known type) internal to the controller, as shown in the cited figures.

However, according to some embodiments of the invention (not shown), the first clock source 5 may be a clock circuit (which may be of known type) external to the controller 4.

Conveniently, the control unit 2 comprises suitable electronic arrangements (not shown) to determine the presence of possible fault conditions (e.g. ground fault conditions, over-current conditions, over-voltage conditions, arc fault conditions, etc.) in the electric line 100. Such electronic arrangements may be of known type and will not here further described for the sake of brevity.

According to the invention, the control unit 2 comprises a clock testing arrangement 6 adapted to check whether the first clock source 5 is properly operating. Such a clock testing arrangement will be described in details in the following.

Conveniently, the control unit 2 may comprise further electronic arrangements (not shown) to determine the presence of internal fault conditions in the electronic protection device. Such additional electronic arrangements may be of known type and will not here further described for the sake of brevity.

According to some embodiments of the invention (FIG. 2), the electronic protection device 1 is in itself adapted to interrupt the flow of a line current IL along the electric line 100.

In this case, according to some configurations (typically dedicated to the North American market), the electronic protection device 1 can take three different operative states, namely a closed state, a tripped state and an open state, during its operating life.

Alternatively, according to other configurations (typically dedicated to the European or other international markets), the electronic protection device 1 can take two different operative states, namely a closed state and an open state, during its operating life.

When it operates in a closed state, the electronic protection device 1 allows a current IL to flow along the electric line 100 between the upstream and downstream portions 100A, 100B of this latter.

When it operates in a tripped state or open state, the electronic protection device 1 interrupts the current IL along the electric line 100, thereby electrically disconnecting the upstream and downstream portions 100A, 100B of this latter.

According to these embodiments of the invention, the electronic protection device 1 comprises one or more pairs of electric contacts 14, each including a mobile contact and a fixed contact.

Each pair of electric contacts 14 is intended to be electrically connected to a corresponding conductor of the electric line 100 and, in operation, can be mutually coupled or separated.

When the electric contacts 14 are mutually coupled, the protection device 1 is in a closed state and an electric current IL can flow along the corresponding conductor of the electric line 100.

When the electric contacts 14 are decoupled, the protection device 1 is in a tripped state or open state and an electric current IL is prevented from flowing along the corresponding conductor of the electric line 100.

The electric contacts 14 and their electrical connection with the corresponding conductors of the electric line 100 may be realized in known manners that will not here described in more details for the sake of brevity.

The electronic protection device 1 further comprises an operating mechanism 11 operatively coupled with the electric contacts 14 (in particular with the mobile contacts thereof) and mechanically interacting with these latter.

The electronic protection device 1 further comprises a tripping unit 12 (e.g. an electromagnetic actuator) adapted to mechanically actuate the operating mechanism 11.

In operation, upon receiving a trip signal TS, the tripping unit 12 actuates the operating mechanism 11 to decouple the electric contacts 14, thereby carrying out a tripping manoeuver of the electronic protection device.

The electronic protection device 1 additionally comprises a handle 13 operatively coupled with the operating mechanism 11 and mechanically interacting with this latter.

The handle 13 is movable (preferably around a suitable rotation axis) between two or three operating positions (depending on the configuration of the electronic protection device).

The handle 13 may be actuated by the operating mechanism 11, by a user or by external equipment during a tripping or opening maneuver of the electronic protection device.

The handle 13 may actuate the operating mechanism 11 to couple or decouple or maintain decoupled (depending on the configuration of the electronic protection device) the electric contacts 14 during an opening manoeuver or a closing maneuver of the electronic protection device.

The electric contacts 14, the operating mechanism 11, the tripping unit 12 and the handle 13 may be of known type and will not here described in more details for the sake of brevity.

As it is evident from the above, in the above-mentioned embodiments of the invention, the electric contacts 14, the operating mechanism 11, the tripping unit 12 and the handle 13 form a relay 10 adapted to interrupt the flow of a line current IL along the electric line 100.

According to the above-mentioned embodiments of the invention, the control unit 2 is conveniently adapted to provide trip signals TS to activate the tripping unit 12 when fault conditions, which require a tripping manoeuvre of the electronic protection device, are determined.

The control unit 2 may however be adapted to carry out signalling functionalities such as providing command signals CS to activate suitable signalling means when fault conditions are determined and/or monitoring functionalities such as providing (e.g. to a remote control device) monitoring signals MS indicative of the operative status of the electric line 100 and/or the electronic protection device 1 itself.

According to other embodiments of the invention (FIG. 3), the electronic protection device 1 is operatively associated to a relay 10A adapted to interrupt the flow of a line current IL along the electric line 100.

The relay 10A may be of known type and will not here described in more details for the sake of brevity.

In this case, the control unit 2 is conveniently adapted to provide trip signals TS or a mechanical force TR to activate the relay 10A when fault conditions, which require an interruption of the electric line 100, are determined.

When it provides a mechanical force TR to trip the relay 10A, the control unit 2 conveniently includes an electromechanical arrangement (not shown) operatively coupled to the relay 10A. Such an electromechanical arrangement (which may be of known type) is activated by suitable control signals generated by the control unit 2 when fault conditions are determined and it provides the mechanical force TR in response to said control signals.

The control unit 2 may however be adapted to carry out signalling functionalities such as providing command signals CS to activate suitable signalling means (not shown—they may be of known type) when fault conditions are determined and/or monitoring functionalities such as providing (e.g. to a remote control device) monitoring signals MS indicative of the operative status of the electric line 100 and/or the electronic protection device 1 itself.

According to further embodiments of the invention (FIG. 4), the electronic protection device 1 is basically adapted to monitor the operative status of the electric line 100.

In this case, the control unit 2 is conveniently adapted to provide (e.g. to a remote control device) monitoring signals MS indicative of the operative status of the electric line 100 and/or the electronic protection device 1 itself.

The control unit 2 may however be adapted to carry out signalling functionalities such as providing command signals CS to activate suitable signalling means (not shown—they may be of known type) when fault conditions are determined.

As mentioned above, according to the invention, the control unit 2 comprises a clock testing arrangement 6 adapted to check whether the first clock source 5, which clocks data processing resources 40 of the controller 4, is properly operating.

According to the invention, the clock testing arrangement 6 comprises:
- a second clock source 61;
- a task-performing module 62 operatively associated to the second clock source 61;
- a data processing module 63 clocked by the first clock source 5 and interacting with the task-performing module 62.

The second clock source 61 is adapted to provide a second clock signal CK2 with a second nominal clock frequency $f_2$.

Preferably, the second nominal clock frequency $f_2$ is conveniently lower than the first nominal clock frequency $f_1$ of the first clock signal CK1.

As an example, the first nominal clock frequency $f_1$ of the first clock signal CK1 may be in the order of tens of MHz (e.g. 16 MHz) whereas the second nominal clock frequency $f_2$ of the second clock signal CK2 may be in the order of tens of kHz (e.g. 12 kHz).

Such a solution greatly facilitates the practical implementation of the clock testing arrangement 6. The second clock source 61 is adapted to operate independently from the first clock source 5. In this way, the second clock signal CK2 constitutes a reference signal that is not influenced by possible frequency variations of the first clock signal CK1.

Conveniently, the second clock source 61 may be a clock circuit (which may be of known type) external to the controller 4 or a clock component (which may be of known type) internal to the controller 4.

The task-performing module 62 is adapted to perform a predefined testing task within an expected time interval $T_E$.

In principle, the task-performing module 62 may be any peripheral component of the microcontroller 4 or any stand-alone electronic device or circuit suitable to perform a given task within a known expected time interval $T_E$.

It is important to underline that the actual nature of the task performed by the task-performing module 62 is not relevant for the purposes of the invention.

The very important feature of the task-performing module 62 consists in that it is capable of normally carrying out such a task within an expected time interval $T_E$, which is known.

The task-performing module 62 is clocked by the second clock source 61. In this way, the clock signal CK2 received from the second clock source 61 provides the task-performing module 62 with the timing for operating (i.e. carrying out the above-mentioned predefined testing task). Conveniently, the expected time interval $T_E$, in which the task-performing module 62 normally carries out the above-mentioned task, is quite longer than the second clock period $T_2=1/f_2$ of the second clock signal CK2.

As an example, the expected time interval $T_E$ may be in the order of tens of ms (e.g. 10 ms) whereas the second clock period $T_2$ may be in the order of tens of μs (e.g. around 80 μs). The task-performing module 62 thus takes a relatively high number (e.g. around 120) of clock cycles of the second clock signal CK2 to carry out the above-mentioned task.

Referring to FIG. 7, the expected time interval $T_E$ is given by the period of time comprised between a start instant $t_S$, at which the above-mentioned predefined task starts being executed, and an end instant $t_E$, at which the above-mentioned predefined task is completed.

Preferably, the task-performing module 62 is adapted to provide a status signal F indicative of whether said task-performing module is not operating (idle state) or is busy executing the above-mentioned predefined testing task (busy state).

As an example, the status signal F may be a logic signal taking a "low" logic level when the task-performing module 62 is in an idle state and taking a "high" logic level while the task-performing module 62 is in a busy state (FIG. 7).

Preferably, the task-performing module 62 is a serial data communication peripheral component of the controller 4.

In this case, as shown in the cited figures, the serial data communication peripheral component 62 performs a predefined testing task that conveniently consists in transferring a given piece of information $I_T$ from an input memory location MEM1 to an output memory location MEM2 within the expected time interval $T_E$.

As the skilled person will certainly understand, the actual nature of the transferred information $I_T$ by the serial data communication peripheral component 62 is not relevant for the purposes of the invention. The very important thing consists in that such information is normally transferred within a known expected time interval $T_E$ (e.g. 10 ms).

Preferably, the serial data communication peripheral component 62 comprises a flag output 620, at which it provides a status signal F (e.g. a logic signal) indicative of whether it is busy transferring the above-mentioned piece of information $I_T$.

The data processing module 63 is adapted to control the task-performing module 62, in particular to command this latter (e.g. by sending suitable control signals C1) to execute the above-mentioned predefined testing task.

According to the invention, the data processing module 63 is adapted to determine whether the first clock source 5 is properly operating by obtaining a measured time value $T_M$ indicative of the time employed by the task-performing module 62 to perform the above-mentioned predefined testing task and by comparing the measured time value $T_M$ with the expected time interval $T_E$.

As mentioned above, the data processing module 63 is clocked by the first clock source 5. In this way, the clock signal CK1 received from the first clock source 5 provides the data processing module 63 with the timing for operating.

The data processing module 63 may be a data processing component internal to the controller 4 or a data processing arrangement (e.g. an electronic circuit of digital type) external to the controller 4.

Preferably, the data processing module 63 is adapted to obtain the measured time value $T_M$ by periodically checking whether the task-performing module 62 has completely carried out the above-mentioned predefined testing task at one or more subsequent checking instants $t_{CK}$.

Preferably, the data processing module 63 checks the status signal F provided by the task-performing module 62 at each checking instants $t_{CK}$.

Preferably, each checking instant $t_{CK}$ is given by the following relation:

$$t_{CK}=t_S+N_1*T_{CK}$$

where $t_S$ is a start instant at which the task-performing module 62 starts executing the above-mentioned predefine task, $T_{CK}$ is a checking period and $N_1$ is an integer number with $N_1>=1$. The data processing module 63 may adopt checking periods $T_{CK}$ of different duration depending on the available computational resources.

According to possible variants of the invention, the checking period $T_{CK}$ is given by the following relation:

$$T_{CK}=N_2*T_1$$

where $T_1=1/f_1$ is a clock period of the first clock signal CK1 and $N_2$ is an integer number with $N_2>=1$.

According to alternative variants of the invention, the checking period $T_{CK}$ is given by the following relation:

$$T_{CK}=N_3*T_s$$

where $T_s$ is a sampling period employed in operation by the controller 4 and $N_3$ is an integer number with $N_3>=1$.

This last solution allows decreasing the computational load of the data processing resources 63. Preferably, the data processing module 63 obtains the measured time value $T_M$ by periodically (i.e. every checking period $T_{CK}$) updating the measured time value $T_M$ at each checking instant $t_{CK}$. Preferably, in order to obtain the measured time value $T_M$, the data processing module 63 updates a first internal counter COUNT at each checking instant $t_{CK}$.

The internal counter COUNT counts a count number $N_{CT}$ of checking cycles executed by the data processing module 63 while the task-performing module is in a busy state.

The measured time value $T_M$ at a given checking instant $t_{CK}$ is thus given by the following relation:

$$T_M=N_{CT}*T_{CK}$$

where $N_{CT}$ is the count number of the internal counter COUNT and $T_{CK}$ is the checking period adopted by the data processing module 63.

Preferably, the data processing module 63 is adapted to execute a test procedure 60 to determine whether the first clock source 5 is properly operating.

Referring to FIGS. 5-7, the test procedure 60 is now described in details.

Conveniently, the test procedure 60 is started with the task-performing module 62 in an initial idle state. In this condition, the task-performing module 62 provides in output a suitable status signal F (e.g. at a "low" logic level) indicating that said task-performing module is in an idle state. The test procedure 60 comprises a starting step 601, in which the data processing module 63 makes the task-performing module 62 start executing the above-mentioned predefined testing task at the start instant $t_S$, preferably by sending control signals C1 to this latter.

In response to the control signals C1, the task-performing module 62 starts operating and provides in output a suitable status signal F (e.g. at a "high" logic level) indicating that it is in a busy state. Contextually to making the task-performing module 62 start operating, the data processing module 63 sets the measured time value $T_M$ at an initialization value.

Preferably, the data processing module 63 resets its internal counter COUNT in order to execute the starting step 601.

The test procedure 60 comprises a checking step 602, in which the data processing module 63 checks whether the task-performing module 62 has completely carried out the above-mentioned predefined testing task at one or more checking instants $t_{CK}$ (following the start instant $t_S$) until the task-performing module 62 has completely carried out said predefined testing task or until too much time has elapsed since the start instant $t_S$.

In practice, at the checking step 602, the data processing module 63 executes one or more checking cycles to check whether the task-performing module 62 has completely carried out the above-mentioned predefined testing task and to check whether too much time has elapsed since the start instant $t_S$.

Said checking cycles are executed at corresponding checking instants $t_{CK}$ following the start instant $t_S$ and up to the instant in which the above-mentioned predefined testing task is completed.

Preferably, as mentioned above, two subsequent checking instants are separated by a given checking period $T_{CK}$.

If the task-performing module 62 has not completed the above-mentioned predefined testing task at a given checking instant $t_{CK}$ and too much time has not elapsed since the start instant $t_S$, a further checking cycle is executed by the data processing module 63 at a following checking instant $t_{CK}+T_{CK}$.

Referring to FIG. 7, it is evident that the task-performing module 62 has not completed the above-mentioned predefined testing task at a given checking instant $t_{CK}$, if said checking instant $t_{CK}$ occurs before the end instant $t_E$ of completion of the above-mentioned predefined task, i.e. before the expected time interval $T_E = t_E - t_S$ has passed.

If the task-performing module 62 has completed the above-mentioned predefined testing task at a given checking instant $t_{CK}$ or too much time has elapsed since the start instant $t_S$, the checking step is completed and the test procedure 60 will continue with a further step.

Referring to FIG. 7, it is evident that the task-performing module 62 has completed the above-mentioned predefined testing task at a given checking instant $t_{CK}$, if said checking instant $t_{CK}$ occurs after the end instant $t_E$, i.e. once the expected time interval $T_E = t_E - t_S$ has passed.

Preferably, the data processing module 63 checks the status signal F provided by the task-performing module 62 at each checking cycle to determine whether the task-performing module 62 has completed the above-mentioned predefined testing task.

If the task-performing module 62 has not been completed the above-mentioned predefined testing task the status signal F will indicate that said task-performing module 62 is still in a busy state (e.g. the status signal F will still be at a "high" logic level). Otherwise, the status signal F will indicate that said task-performing module 62 has returned in an idle state (e.g. the status signal F will have returned at a "low" logic level).

Preferably, in order to determine whether too much time has elapsed since the start instant $t_S$, the data processing module 63 checks, at each checking cycle, whether the following condition is verified:

$$T_M > T_{MAX}$$

or in an equivalent manner:

$$T_M = N_{CT} * T_{CK} > T_{MAX} = N_{MAX} * T_{CK}$$

or in an equivalent manner:

$$N_{CT} > N_{MAX}$$

where $N_{CT}$ is the count number of the internal counter COUNT, $T_{CK}$ is the checking period adopted by the data processing module 63, $T_{MAX}$ is a maximum time higher than the expected time interval $T_E$ in such a way to be out of a predefined compatibility range $R = [T_E - \Delta T, T_E + \Delta T]$ provided for the expected time interval $T_E$ and $N_{MAX}$ is a maximum counter number depending on the maximum time $T_{MAX}$.

At each checking instant $t_{CK}$, the data processing module 63 updates the measured time value $T_M$. Preferably, at each checking instant $t_{CK}$, the data processing module 63 updates the internal counter COUNT by increasing the count number $N_{CT}$ in order to update the measured time value $T_M$. When the task-performing module 62 has completely carried out the above-mentioned predefined testing task, the checking test 602 is completed.

Preferably, as indicated above, the data processing module 63 determines that the task-performing module 62 has completely carried out the above-mentioned predefined testing task by checking the status signal F provided by the task-performing module 62.

Then, the test procedure 60 comprises a determination step 603, at which the data processing module 63 compares the measured time value $T_M$ with the expected time interval $T_E$ and determines whether the measured time value $T_M$ is compatible with the expected time interval $T_E$.

Preferably, the measured time value $T_M$ is now indicative of the overall number of checking cycles executed by the data processing module 63 as this latter has periodically updated the internal counter COUNT at each checking instant $t_{CK}$.

The skilled person will certainly understand that the calculation of the measured time value $T_M$ as described above may be subject to timing errors due to possible time misalignments possibly occurring during the interaction between the data processing module 63 and the task-performing module 62. However, the actual impact of said timing errors is reduced as the expected time interval $T_E$ is quite longer than the second clock period $T_2$ of the second clock signal CK2.

Preferably, the data processing module 63 determines whether the measured time value $T_M$ is compatible with the expected time interval $T_E$ by checking whether the measured time $T_M$ falls within a compatibility range $R = [T_E - \Delta T, T_E + \Delta T]$ centered on the expected time interval $T_E$ ($\Delta T$ is a predefined compatibility time threshold).

If it falls within the compatibility range R, the measured time value $T_M$ is considered as compatible with the time interval $T_E$. Otherwise, the measured time value $T_M$ is considered as incompatible with the time interval $T_E$.

Once the determination step 603 is executed, the data processing module 63 has completed the test procedure 60.

Preferably, the data processing module 63 is adapted to repeat the test procedure 60 for one or more repetition cycles.

Preferably, the data processing module 63 is adapted to put the control unit 2 in a risk-addressed state indicative of the presence of fault conditions, if the measured time value $T_M$ is determined as incompatible with the expected time interval $T_E$ for a maximum number of repetition cycles, which is predefined according to the needs.

Preferably, at each repetition cycle in which it determines that the measured time value $T_M$ is incompatible with the expected time interval $T_E$, the data processing module 63 updates a second internal counter COUNT2.

When the count number $N_{ERR}$ of the internal counter COUNT2 exceeds a predefined counting value, the data processing module 63 puts the control unit 2 in a risk-addressed state.

Preferably, the data processing module 63 resets the internal counter COUNT2 at predefined time instants, which are separated by time intervals much longer than the time $N_{ERR}*T_E$ (e.g. 2 hours). When it is in a risk-addressed state, the control unit 2 may carry out protection functionalities by generating a trip signal TS to activate an internal relay 10 or an external relay 10A and/or carry out signalling functionalities by providing command signals CS to activate suitable signalling means and/or carry out monitoring functionalities by providing monitoring signals MS indicative of the operative status of the electronic protection device 1.

According to possible variants of the invention, the expected time interval $T_E$ may be a time value stored in a memory, which is suitably set depending on the performances of the task-performing module 62.

As an alternative, the expected time interval $T_E$ may be a calibration time value stored in a memory, which is measured and set when the task-performing module 62 is installed.

As a further alternative, the expected time interval $T_E$ may be run-time calculated (e.g. by the controller 4) as a function of at least a temperature value indicative of a temperature measured in or in proximity of the control unit 2.

The time threshold $\Delta T$ may be set similarly to the expected time interval $T_E$.

In practice, it has been found that the electronic protection device, according to the invention, fully achieves the intended aim and objects.

The electronic protection device 1, according to the invention, includes a clock testing arrangement 6 that is capable of providing a reliable and efficient check of the functionalities of the first clock source 5 clocking the data processing resources 40 of the controller 4.

The clock testing arrangement 6 does not require a high computational load for the controller 4 and can be easily and cheaply arranged at industrial level.

The clock testing arrangement 6 shows a high flexibility of use and can be employed in electronic protection devices of different types.

The electronic protection device 1 has proven to be easy to industrially manufacture, at competitive costs with respect to currently available electronic protection devices.

The invention claimed is:

1. An electronic protection device for a low voltage electric line, said protection device being provided with a control unit comprising a controller including digital data processing resources clocked by a first clock source adapted to provide a first clock signal (CK1) with a first nominal clock frequency (fi), said control unit comprising a clock testing arrangement adapted to check whether said first clock source is properly operating, wherein said clock testing arrangement comprises:
    a second clock source adapted to provide a second clock signal (CK2) with a second nominal clock frequency (f2), said second clock source being adapted to operate independently from said first clock source;
    a task-performing module clocked by said second clock source, said task-performing module being adapted to perform a predefined testing task within an expected time interval (TE);
    a data processing module clocked by said first clock source and adapted to control the operation of said task-performing module, said data processing module being adapted to determine whether said first clock source is properly operating by obtaining a measured time value (TM) indicative of the time employed by said task-performing module (62) to perform said predefined testing task and by comparing said measured time value (TM) with said expected time interval (TE).

2. The electronic protection device, according to claim 1, wherein the second nominal clock frequency ($f_2$) of said second clock source is lower than said first nominal clock frequency ($f_1$) of said first clock source.

3. The electronic protection device, according to claim 2, wherein said data processing module is adapted to obtain said measured time value ($T_M$) by periodically checking whether said task-performing module has completely carried out said predefined testing task at one or more subsequent checking instants ($t_{CK}$) and by periodically updating said measured time value ($T_M$) at each checking instant ($t_{CK}$).

4. The electronic protection device, according to claim 3, wherein said each checking instant ($t_{CK}$) is given by the relation $t_{CK}=t_S+N_1*T_{CK}$, where $t_S$ is a start instant of execution of said predefined testing task, $T_{CK}$ is a checking period and $N_1$ is an integer number with $N_1>=1$.

5. The electronic protection device, according to claim 4, wherein said checking period ($T_{CK}$) is given by the relation $T_{CK}=N_2*T_1$, where $T_1$ is a clock period of said first clock signal (CK1) and $N_2$ is an integer number with $N_2>=1$.

6. The electronic protection device, according to claim 4, wherein said checking period ($T_{CK}$) is given by the relation $T_{CK}=N_3*T_S$, where $T_S$ is a sampling period employed by said controller and $N_3$ is an integer umber with $N_3>=1$.

7. The electronic protection device, according to claim 1, wherein said data processing module is adapted to obtain said measured time value ($T_M$) by periodically checking whether said task-performing module has completely carried out said predefined testing task at one or more subsequent checking instants ($t_{CK}$) and by periodically updating said measured time value ($T_M$) at each checking instant ($t_{CK}$).

8. The electronic protection device, according to claim 7, wherein said each checking instant ($t_{CK}$) is given by the relation $t_{CK}=t_S+N_1*T_{CK}$, where $t_S$ is a start instant of execution of said predefined testing task, $T_{CK}$ is a checking period and $N_1$ is an integer number with $N_1>=1$.

9. The electronic protection device, according to claim 8, wherein said checking period ($T_{CK}$) is given by the relation $T_{CK}=N_3*T_S$, where $T_S$ is a sampling period employed by said controller and $N_3$ is an integer umber with $N_3>=1$.

10. The electronic protection device, according to claim 8, wherein said data processing module is adapted to execute a test procedure comprising:—executing a starting step, in which said data processing module makes said task-performing module start executing said predefined testing task and sets said measured time value (TM) at an initialization value, at a start instant (ts;
    executing a checking step, in which said data processing module checks whether said task-performing module has completely carried out said predefined testing task at one or more subsequent checking instants (tCK) until said task-performing module has completely carried out said predefined testing task or until said measured time has exceeded a maximum value, said data processing module updating said measured time value (TM) at each checking instant (tCK);
    when said task-performing module has completely carried out said predefined testing task or when said measured time has exceeded a maximum value, executing a determination step, in which said data processing module compares said measured time value (TM) with said expected time interval (TE) and determines whether said measured time value (TM) is compatible with said expected time interval (TE).

11. The electronic protection device, according to claim 8, wherein said checking period ($T_{CK}$) is given by the relation $T_{CK}=N_2*T_1$, where $T_1$ is a clock period of said first clock signal (CK1) and $N_2$ is an integer number with $N_2 \geq 1$.

12. The electronic protection device, according to claim 11, wherein said data processing module is adapted to execute a test procedure comprising:
   executing a starting step, in which said data processing module makes said task-performing module start executing said predefined testing task and sets said measured time value (TM) at an initialization value, at a start instant (ts);
   executing a checking step, in which said data processing module checks whether said task-performing module has completely carried out said predefined testing task at one or more subsequent checking instants (tCK) until said task-performing module has completely carried out said predefined testing task or until said measured time has exceeded a maximum value, said data processing module updating said measured time value (Tm) at each checking instant (tcx); when said task-performing module has completely carried out said predefined testing task or when said measured time has exceeded a maximum value, executing a determination step, in which said data processing module compares said measured time value (Tm) with said expected time interval (Te) and determines whether said measured time value (Tm) is compatible with said expected time interval (Te);
   when said task-performing module has completely carried out said predefined testing task or when said measured time has exceeded a maximum value, executing a determination step, in which said data processing module compares said measured time value (TM) with said expected time interval (TE) and determines whether said measured time value (TM) is compatible with said expected time interval (TE).

13. The electronic protection device, according to claim 7, wherein said data processing module is adapted to execute a test procedure comprising:
   executing a starting step, in which said data processing module makes said task-performing module start executing said predefined testing task and sets said measured time value (TM) at an initialization value, at a start instant (ts);
   executing a checking step, in which said data processing module checks whether said task-performing module has completely carried out said predefined testing task at one or more subsequent checking instants (tCK) until said task-performing module has completely carried out said predefined testing task or until said measured time has exceeded a maximum value, said data processing module updating said measured time value (TM) at each checking instant (tCK;
   when said task-performing module has completely carried out said predefined testing task or when said measured time has exceeded a maximum value, executing a determination step, in which said data processing module compares said measured time value (TM) with said expected time interval (TE) and determines whether said measured time value (TM) is compatible with said expected time interval (TE).

14. The electronic protection device, according to claim 13, wherein said data processing module is adapted to check a status signal (F) indicative of whether said task-performing module is in an idle state or is in a busy state, when executing said checking step.

15. The electronic protection device, according to claim 14, wherein said data processing module is adapted to check a status signal (F) indicative of whether said task-performing module is in an idle state or is in a busy state, when executing said checking step.

16. The electronic protection device, according to claim 14, wherein said data processing module is adapted to execute said test procedure for one or more repetition cycles.

17. The electronic protection device, according to claim 13, wherein said data processing module is adapted to execute said test procedure for one or more repetition cycles.

18. The electronic protection device, according to claim 17, wherein said data processing module is adapted to put said control unit in a risk-addressed state, if said measured time value ($T_M$) is incompatible with said expected time interval ($T_E$) for one or more repetition cycles.

19. The electronic protection device, according to claim 1, wherein said expected time interval ($T_E$) is a predefined time value or a calibration time value stored in a memory.

20. The electronic protection device, according to claim 1, wherein said expected time interval ($T_E$) is a time value calculated as a function of at least a temperature value indicative of a temperature measured in or in proximity of said control unit.

* * * * *